United States Patent [19]

Liu et al.

[11] 4,451,924
[45] May 29, 1984

[54] MERCURY HALIDE LASERS UTILIZING ELECTRODES COATED WITH A GETTER

[75] Inventors: Chi-Sheng Liu, Monroeville; Chikara Hirayama, Murrysville, both of Pa.

[73] Assignee: Westinghouse Electric Corp., Pittsburgh, Pa.

[21] Appl. No.: 379,811

[22] Filed: May 19, 1982

[51] Int. Cl.³ .............................................. H01S 3/22
[52] U.S. Cl. ...................................... 372/59; 372/33; 372/87; 313/558
[58] Field of Search ....................... 372/59, 55, 33, 87, 372/85; 313/553, 558, 561, 565, 557

[56] References Cited

U.S. PATENT DOCUMENTS

| | | | |
|---|---|---|---|
| 3,543,076 | 11/1970 | Haslund | 313/558 |
| 3,605,036 | 9/1971 | Barnaby | 372/59 |
| 3,727,089 | 4/1973 | Chow | 313/558 |
| 4,024,465 | 5/1977 | Farish | 372/87 |
| 4,150,343 | 4/1979 | Seelig et al. | 372/60 |
| 4,228,408 | 10/1980 | Schimitschek et al. | 372/87 |
| 4,305,017 | 12/1981 | Kuus et al. | 313/557 |
| 4,317,087 | 2/1982 | Sander et al. | 372/59 |

FOREIGN PATENT DOCUMENTS 2028571 3/1980 United Kingdom .................. 372/59

OTHER PUBLICATIONS

Sorem et al., "Catalytic Converters for Closed-Cycle Operation of Isotopic $CO_2$ TEA Lasers", Rev. Sci. Instrum. 52(8), Aug. 1981, pp. 1193–1196.

Primary Examiner—James W. Davie
Attorney, Agent, or Firm—J. B. Hinson

[57] ABSTRACT

A laser utilizing mercury halides as the lasing medium is disclosed. Electrodes selectively coated with a mercury gettering material are utilized to establish a glow discharge in the lasing medium. Proper ratio of mercury to bromine is maintained in the lasing medium to ensure long life operation.

7 Claims, 2 Drawing Figures

MERCURY HALIDE LASERS UTILIZING ELECTRODES COATED WITH A GETTER

STATEMENT OF GOVERNMENT INTEREST

This invention was first conceived and reduced to practice under contract No. 66001-80-C-0319.

CROSS-REFERENCE TO RELATED APPLICATIONS

This invention is related to an invention entitled "Mercury Halide Lasers Utilizing A Getter" Ser. No. 373,598, which is assigned to the same assignee as this application.

BACKGROUND OF THE INVENTION

1. Field of the Invention

The invention relates to lasers and more specifically to lasers utilizing mercury halides as the lasing medium and getters to maintain the mercury generated by disassociation of the lasing medium at an acceptable level.

2. Description of the Prior Art

Lasers utilizing gaseous compounds of mercury halides as the lasing medium are well known in the art. During normal operation, free mercury is generated when portions of the lasing medium becomes disassociated and reacted with components in the laser tube for example the electrodes. Reaction of the components with the lasing medium limited the useful life of the lasers. Also free mercury tends to deactivate the upper energy levels of the lasing medium. As the partial vapor pressure of the mercury increases, the laser output constantly decreases eventually reaching an unusable level. This mechanism limited the useful life of prior art lasers of this type to relatively few hours, typically less than ten. A typical prior art mercury halide laser is disclosed in U.S. Pat. No. 4,228,408 issued to Schimitschek et al.

SUMMARY OF THE INVENTION

The laser system and electrodes which are the subject of this invention substantially reduces the problems associated with free mercury in prior art mercury halide lasers by coating the electrodes with an amalgam of gold and mercury. An amalgam of mercury and other noble metals is also useable. This prevents excess build up of free mercury thereby maintaining the partial vapor pressure of mercury at an acceptable level. In the preferred embodiment comprising a mercury bromide lasing medium, the preferred amalgam is gold and mercury. This technique for reducing the detrimental effects of the reaction of the lasing medium with the laser structure may be used with other laser systems in which undesirable reactions of the lasing medium with components of the laser may occur.

DETAILED DESCRIPTION

Figure 1:
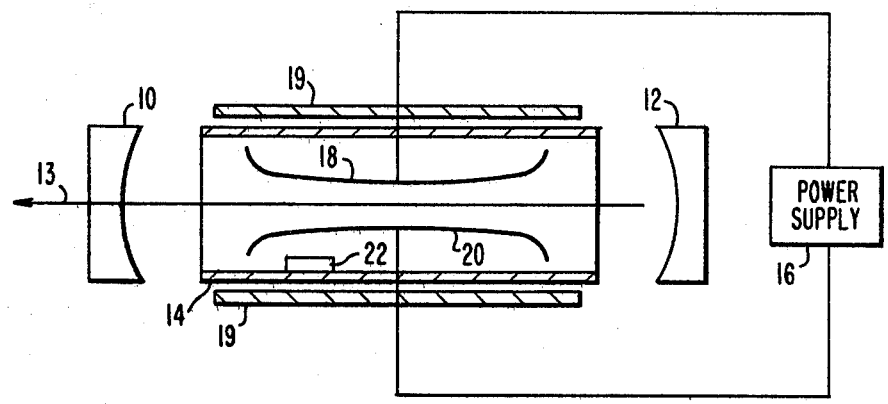
FIG. 1 is a drawing illustrating a prior art laser system utilizing a gettering material to remove detrimental materials from the enclosure containing the lasing medium.

FIG. 1 is a diagram illustrating a prior laser utilizing a body of gettering material 22 to reduce the partial vapor pressure of free mercury within the laser enclosure 14. Two conventional reflectors 10 and 12 form a resonant optical cavity. Positioned within the resonant optical cavity formed by the reflectors 10 and 12 is the enclosure 14 which includes therein the lasing medium. Typically the lasing medium is mercury bromide, although other mercury halides such as mercury chloride or mercury iodide are equally usable.

The enclosure 14 is heated to a temperature sufficient to maintain the lasing medium in a gaseous state by a resistance type heating element 19 surrounding the enclosure 14 or a self-heat from the watt power of the laser. Reflector 10 is a partially transmitting mirror through which the output beam 13 emerges along the optical axis of the laser.

A power supply 16 is coupled to first and second electrodes 18 and 20, each having a contoured profile to produce a glow discharge in the gaseous (mercury halide) lasing medium, as is well known in the prior art. Although not illustrated, the laser may include other conventional prior art electrodes to generate UV or electrons to initiate the glow discharge. The resonant cavity and other components of the laser described above are conventional in the art. Other electrode and cavity configurations may be usable.

During normal operation, a small portion of the mercury bromide will become disassociated, react with the metal parts of the laser including the electrodes 18 and 20 and the enclosure 14. This reaction generates free mercury. Positioned within the enclosure 14 at a convenient location is a small quantity of gettering material 22. This material is selected such that it amalgamates (combine readily) with the free mercury to maintain the partial pressure of the mercury within the enclosure 14. Typically, for mercury halide lasers the gettering material may be gold, platinum or iridium. Alternatively, the getter material 20 may be eliminated entirely and the electrodes themselves be made of or covered with the gettering material as subsequently discussed. Using noble metals as mercury getters in mercury halide lasers sometimes can over-getter the mercury which will cause a mercury deficiency in the laser system. In order to balance the proper ratio of free mercury to bromine, a getter mode of noble metal-mercury amalgam can be used.

Figure 2:
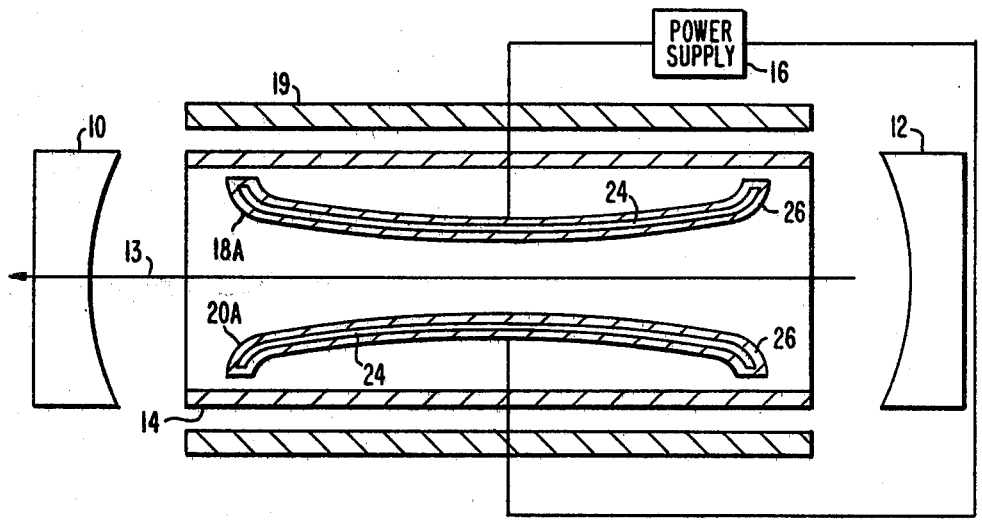
FIG. 2 is a diagram illustrating laser system which is the subject of this invention.

FIG. 2 illustrates the laser system and the electrodes 18A and 20A which comprise the preferred embodiment of the invention. The laser illustrated in FIG. 2 is identical to the laser illustrated in FIG. 1 except for the modified electrodes 18A and 20A and the body of gettering material 22 has been removed. To emphasize this similarity the same reference numbers have been used in FIGS. 1 and 2 to identify similar components. Additionally, no component by component description of the laser illustrated in FIG. 2 is included because the general description of the laser shown in FIG. 1 is also applicable to the laser shown in FIG. 2.

As discussed above, the laser shown in FIG. 2 utilizes modified contoured electrodes 18A and 20A. Each of these electrodes, 18A and 20A includes a core member 24 composed of some base metal such as stainless steel, for example. Surrounding the core member 24 is a getter layer 26 comprising a metal which amalgamates with mercury, such as gold for example. On the surface of the layer 26 is a thin layer (not illustrated for convenience) of the amalgam.

A convient method for forming the layer 26 is to wrap the core member 24 with a gold foil by hand. After the core member 24 has been coated with the gold foil, layer 26, the electrode is emersed in mercury to form a thin gold-mercury amalgam layer on the surface. The laser is then assembled as illustrated in FIG. 2.

During normal operation, any constituents of the mercury halide lasing medium which become dissociated will not readily react with the constituents of the amalgam layer. This limits the build up of depletion of free mercury and extends the useful life of the laser.

What we claim is:

1. A laser comprising:
   (a) an enclosure for containing a gaseous compound lasing medium in a laser cavity, said gaseous compound having a tendency to disassociate into its individual components during normal operation;
   (b) electrode means for exciting said lasing medium; and
   (c) means for reducing the chemical reaction between said electrode means and selected ones of said individual components of said lasing medium which become disassociated during normal operations of said laser, comprising a mercury amalgam layer affixed to at least a portion of the surface of said electrode means.

2. A laser in accordance with claim 1 wherein said lasing medium comprises a chemical compound which includes mercury.

3. A laser in accordance with claim 2 wherein each of said electrodes includes a substantially flat central portion and edge portions which curve outwardly from the optical axis of said laser system.

4. A laser in accordance with claim 3 wherein mercury amalgam layer includes a constituent selected from a group consisting of:
   (a) gold,
   (b) platinum,
   (c) iridium.

5. A laser in accordance with claim 4 wherein said lasing medium is selected from a group consisting of
   (a) mercury bromide,
   (b) mercury chloride,
   (c) mercury iodide.

6. A laser system comprising:
   (a) an enclosure for containing mercury bromide in a gaseous form in a laser cavity;
   (b) electrode and power source means for establishing a glow discharge in said gaseous mercury bromide, said electrode means including an outer surface covered by an amalgam layer, said amalgam layer including gold and mercury.

7. An electrode for exciting a mercury halide lasing medium, said electrode including:
   (a) a core member of a first metal;
   (b) an outer layer of a second metal which amalgamates with mercury;
   (c) a thin amalgamate layer of said second metal and mercury on the surface of said metal outer layer.

* * * * *